United States Patent Office 3,641,153
Patented Feb. 8, 1972

3,641,153
N-OXIDES OF AMINOALKYLENE-DIBENZO[a,d] CYCLOHEPTENES AND THE SALTS THEREOF
Emilio Kyburz, Reinach, and Hans Spiegelberg, Basel, Switzerland, assignors to Hoffmann-La Roche Inc., Nutley, N.J.
No Drawing. Filed Mar. 12, 1969, Ser. No. 806,701
Claims priority, application Switzerland, Mar. 20, 1968, 4,201/68
Int. Cl. C07c 87/02
U.S. Cl. 260—570.8 TC
14 Claims

ABSTRACT OF THE DISCLOSURE

1 - halo-5-(3-dimethylaminopropyl or propylidene)-5H-dibenzo[a,d]cycloheptene N-oxides, prepared, inter alia, from the corresponding 1-halo-5-(3-dimethylaminopropyl or propylidene) - 5H - dibenzo[a,d]cycloheptenes, are described. The end products are useful antidepressants.

BRIEF SUMMARY OF THE INVENTION

The invention relates to tricyclic compounds of the formulas

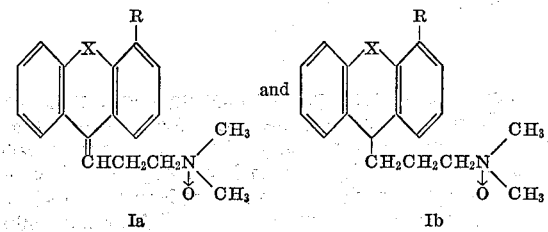

wherein R is chlorine or fluorine and X is ethylene or vinylene, and their stereoisomers and pharmaceutically acceptable acid addition salts. The compounds of formulas Ia and Ib are useful antidepressant agents.

In another aspect, the invention relates to intermediates and processes.

DETAILED DESCRIPTION OF THE INVENTION

The invention relates to tricyclic compounds of the formulas

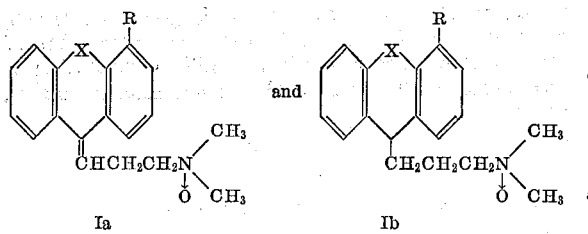

wherein R is chlorine or fluorine and X is ethylene or vinylene, and their stereoisomers and pharmaceutically acceptable acid addition salts. The compounds of Formulas Ia and Ib possess high antidepressive action and low toxicity, and are distinguished by the absence or only insignificant antichlorinergic action, which is particularly advantageous. Furthermore, the compounds of Formulas Ia and Ib are distinguished by various actions on the nervous system, for example, narcosis-potentiating adrenolytic, sedative, antihistamine-like and local anesthetic actions.

In the above Formulas Ia and Ib, R preferably is chlorine. Representatives of the compounds of Formulas Ia and Ib are, for example:

1-chloro-5-(3-dimethylaminopropylidene)-5H-dibenzo-[a,d]cycloheptene N-oxide;
1-chloro-10,11-dihydro-5-(3-dimethylaminopropylidene)-5H-dibenzo[a,d]cycloheptene N-oxide;
1-chloro-5-(3-dimethylaminopropyl)-5H-dibenzo[a,d]cycloheptene N-oxide;
1-chloro-10,11-dihydro-5-(3-dimethylaminopropyl)-(5H-dibenzo[a,d]cycloheptene N-oxide; and the like.

Particularly interesting is 1-chloro-5-(3-dimethylaminopropylidene)-5H-dibenzo[a,d]cycloheptene N-oxide.

The present invention relates to the tricyclic compounds of Formulas Ia and Ib, their isomers and pharmaceutically acceptable acid addition salts, as well as intermediates and processes.

A process of the invention for preparing the tricyclic compounds of Formula Ia and Ib comprises oxidizing a compound of the formula

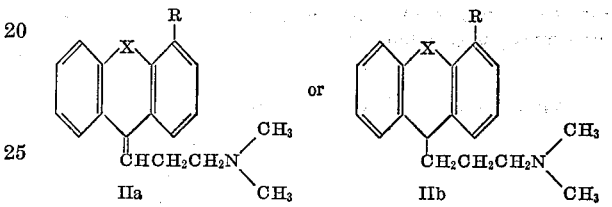

wherein R and X are as previously described.

Another process comprises dehydrating a compound of the formula

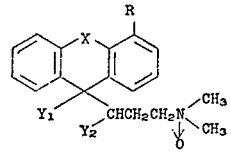

II wherein R and X are as previously described and one of the symbols $Y_1$ and $Y_2$ is hydrogen and the other is hydroxyl, or an acid addition salt thereof.

Still another process comprises reacting a compound of the formula

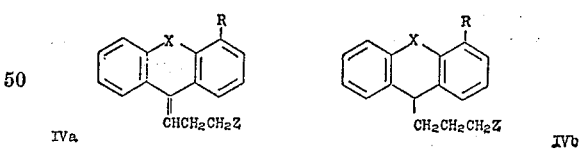

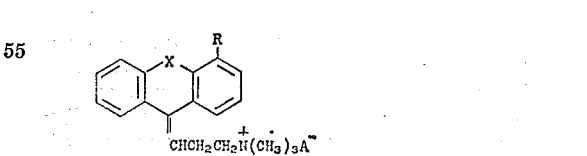

V or

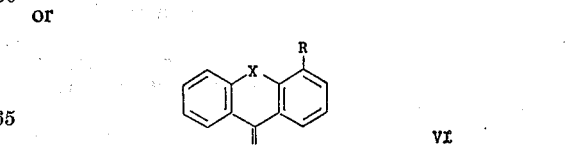

VI wherein R and X are as previously described; Z is a halogen or a substituted sulfonyloxy residue and A is the anion of an acid, with dimethylhydroxylamine.

A still further process comprises reacting a compound of the formula

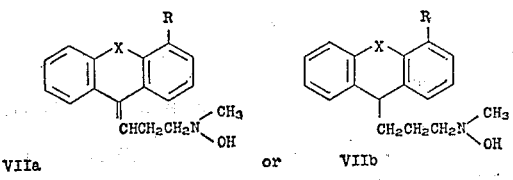

wherein R and X are as previously described, with a methylating agent.

In the aforementioned processes, in any desired sequence, the isomers are isolated from an isomer mixture obtained, if desired, and a base obtained is converted into a pharmaceutically acceptable acid addition salt, if desired.

According to a preferred process embodiment of the invention, a tertiary amine of the Formula IIa or IIb is oxidized. As the oxidizing agent, there can be utilized organic peroxides, for example, monosubstituted organic peroxides such as $C_1$–$C_4$ alkyl or alkanoyl hydroperoxides, such as t.butyl hydroperoxide, performic acid, peracetic acid, and the like; phenyl-substituted derivatives of these hydroperoxides, such as cumol hydroperoxide, perbenzoic acid, and the like. The phenyl substitutent can be substituted, if desired, with, for example, $C_1$–$C_4$ alkyl or alkoxy, halogen or carboxy groups, exemplary of such compounds are 4-methylperbenzoic acid, 4-methoxyperbenzoic acid, 3-chloroperbenzoic acid, monoperphthalic acid, and the like. Inorganic oxidizing agents can also be used, for example, hydrogen peroxide; ozone; hypochlorites, such as sodium, potassium or ammonium hypochlorite; peroxymono- and peroxydisulfuric acid. The use of hydrogen peroxide is preferred. Advantageously, the oxidation is effected in a solvent such as, for example, methanol, ethanol, ether, benzene or chloroform and at a temperature in the range of between about $-50°$ C. and $+100°$ C. After a conventional working up, with the removal of the excess oxidizing agent, the corresponding N-oxide of Formula Ia or Ib is obtained. The latter is conveniently recovered in the form of an acid addition salt.

The tertiary amine of Formula IIa or IIb employed in the above reaction can be prepared according to various methods. An exocyclically unsaturated amine of Formula IIa is conveniently prepared as follows:

1-chloro(or fluoro)-5H-dibenzo[a,d]cyclohepten-5-one or the corresponding 10,11-dihydro compound is reacted with a dimethylaminopropyl magnesium halide. After hydrolysis of the resulting addition product, for example, with saturated ammonium chloride solution, the 5-carbinol obtained is dehydrated by heating with a mineral acid, for example, with ethanolic hydrochloric acid whereby a compound of Formula IIa having an exocyclic double bond in the 5-position is obtained.

The preparation of exocyclically saturated amines of Formula IIb is effected, for example, as follows:

The 5-carbinol obtained above is reduced with nascent hydrogen, for example, zinc in glacial acetic, or with hydroiodic acid in the presence of red phosphorus. Another method, which is particularly suitable for obtaining exocyclically saturated 10,11-unsaturated amines of Formula IIb is the following: 1-chloro(or fluoro)-5H-dibenzo[a,d] cycloheptene-5-one (or the corresponding 10,11-dihydro compound) is reduced to the corresponding 5-hydroxy compound by treatment with sodium borohydride in dioxane-water; by treatment with a halogen halide, the latter compound is converted into the corresponding 5-halo compound, which can be converted to an exocyclically saturated compound of Formula IIb, for example in ether, benzene or tetrahydrofuran and at boiling heat by reaction with a dimethylaminopropyl magnesium halide According to a further process embodiment of the invention, a carbinol of Formula III is dehydrated. Preferred starting compounds of Formula III are those in which $Y_1$ is hydroxyl and $Y_2$ is hydrogen.

The dehydration of compounds of Formula III leads to compounds of Formula Ia having an exocyclic double bond in the 5-position. The dehydration is conveniently carried out employing mineral acids such as hydrochloric or hydrobromic acid, in which case one can work in an anhydrous or aqueous medium. The dehydration is preferably carried out in ethanolic hydrochloric acid at a temperature in the range of between room temperature and the boiling point of the reaction mixture. However, it also proceeds by heating, for example, at $50°$ C. to reflux temperature, preferably at reflux temperature, with a high-boiling anhydrous solvent such as dimethyl sulfoxide. Other usual dehydrating agents can also be employed, for example, sulfuric acid, phosphorus oxychloride, zinc chloride or potassium bisulfate, for example, in an inert organic solvent, such as, chloroform or methylene chloride, at a temperature in the range of between room temperature and the boiling point of the reaction mixture.

Starting carbinols of Formula III wherein $Y_1$ is hydroxyl and $Y_2$ is hydrogen are obtainable by the oxidation of 1-chloro(or fluoro)-5-(3-dimethylaminopropyl)-5 - hydroxy - 5H - dibenzo[a,d]cycloheptene or the corresponding 10,11-dihydro compound. The oxidation is effected by treatment with any one of the oxidizing agents mentioned hereinabove, preferably by treatment with hydrogen peroxide in a solvent such as methanol, ethanol, ether, benzene or chloroform, at about room temperature. After decomposition of the excess hydrogen peroxide with, for example, platinum black, the desired compound of Formula III can be recovered after evaporation of the solvent. The product can sometimes be crystallized by vigorous stirring, for example, at a temperature in the range of between about $-20°$ and $0°$ C., and subsequently recovered by simple filtration and rinsing.

Starting carbinols of Formula III wherein, on the other and, $Y_1$ is hydrogen and $Y_2$ is hydroxyl are obtained, for example, by reacting a corresponding tricyclic 5-ketone with ethyl magnesium bromide and hydrolyzing the reaction product. The resulting 5-hydroxy-5-ethyl compound is dehydrated with acetyl chloride and subsequently treated with formic acid and hydrogen peroxide. The resulting 5-hydroxy-5-(1-hydroxyethyl) compound is dehydrated to the corresponding 5-acetyl compound with aqueous sulfuric acid. By treatment with formaldehyde and dimethylamine hydrochloride there is obtained a 5-dimethylaminopropionyl compound which is converted to the corresponding carbinol by reduction with sodium borohydride. The reduction product is subsequently oxidized as described above for the preparation of the carbinols of Formula III in which $Y_1$ is hydroxyl and $Y_2$ is hydrogen.

A further embodiment of the process of the invention comprises treating a compound of the Formulas IVa, IVb, V or VI with dimethylhydroxylamine.

In the above Formula IVa or IVb, Z preferably is a chlorine or bromine. When Z is a substituted sulfonyloxy residue, preferably it is lower alkylsulfonyloxy residue, such as mesyloxy; phenylsulfonyloxy; lower alkylphenylsulfonyloxy residue, such as tosyloxy; or phenyl-(lower alkyl)-sulfonyloxy residue, such as phenylmesyloxy. The anion A of Formula V is preferably derived from an inorganic acid such as hydrochloric acid, hydrobromic acid, hydroiodic acid, sulfuric acid or the like.

The reaction of compounds of Formulas IVa, IVb, V and VI with dimethylhydroxylamine is preferably carried out in the presence of an excess of dimethylhydroxylamine. Conveniently, the reaction can be conducted in the presence of a basic catalyst, for example, potassium carbonate, sodium amide, potassium amide or the like. The reaction can be effected in an organic solvent such as methanol, ethanol, acetone, benzene or toluene. While the reaction temperature is not critical, it conveniently can be in the range of between $0°$ C. and the boiling point of the reaction mixture.

The starting compounds of Formula IVa or IVb may, for example, be obtained by reacting the corresponding tricyclic 5-ketone with a methoxypropyl magnesium halide, with subsequent hydrolysis, reduction or dehydration of the resulting carbinol and treatment of the resulting methoxypropyl(idene) compound with an excess of a hydrohalic acid, for example, hydrobromic acid, to form the corresponding halopropyl(idene) compound of Formula IVa or IVb. If the methoxypropyl(idene) compound is treated with dilute hydrohalic acid, the corresponding hydroxypropyl(idene) compound can be recovered. The latter can be reacted with a substituted sulfonyl halide, for example, the chloride, to form a correspondingly substituted sulfonyloxypropyl(idene) compound of Formula IVa or IVb.

The quaternary salt of Formula V also employable as the starting material, can be obtained by quaternization of the corresponding dimethylamino compound with a methylating agent such as methyl chloride, methyl bromide, methyl iodide or dimethylsulfate. The starting compound of Formula VI is obtainable, for example, by the reaction of an allyl Grignard compound with the corresponding tricyclic 5-ketone and subsequent hydrolysis and dehydration.

According to a further embodiment of a process of the invention, one proceeds in such a way that a tricyclic hydroxyamine of Formula VIIa or VIIb is reacted with a methylating agent, such as, for example, a compound of the formula $CH_3Z$, wherein Z is halogen, preferably chlorine, bromine or iodine, or a substituted sulfonyloxy residue, for example, a lower (cyclo-)alkylsulfonyloxy residue, such as mesyloxy, cyclopropylsulfonyloxy; phenylsulfonyloxy; a lower alkylphenylsulfonyloxy such as tosyloxy; or a phenyl-(lower alkyl)sulfonyloxy such as phenylmesyloxy. Dimethyl sulfate can also be used as the methylating agent. The reaction is conveniently effected in the presence of a polar solvent, for example, acetone, methanol, dimethylformamide and the like, at a temperature in the range of between about 0° C. and the boiling point of the reaction mixture.

The starting tricyclic hydroxylamine of Formula VIIa or VIIb can, for example, be obtained by the following reaction chain:

1 - chloro(or fluoro) - 5H - dibenzo[a,d]cyclohepten-5-one or the corresponding 10,11-dihydro compound is reacted with a methylbenzylaminopropyl magnesium halide. After hydrolysis of the resulting addition product, for example, with saturated ammonium chloride solution, the 5-carbinol obtained is reacted with ethyl chloroformate. The 5-hydroxy-5-[3 - (methyl-carbethoxyamino)-propyl] compound thus obtained is then hydrolyzed with an alkali, for example, by boiling with aqueous potassium hydroxide solution, whereby a decarboxylation occurs to form the corresponding 5-hydroxy-5-(3-methylaminopropyl) compound. The latter can be reduced to the corresponding 5-(3-methylaminopropyl) compound by treatment with nascent hydrogen, for example, zinc in glacial acetic, or with hydroiodic acid in the presence of red phosphorus. If, on the other hand, it is heated with a mineral acid, for example, with ethanolic hydrochloric acid, the corresponding 5-(3-methylaminopropylidene) compound is formed. The reaction product is then oxidized in the manner described above, conveniently by treatment at about 0° C. with benzoyl peroxide in an organic solvent such as ether or chloroform. The methylbenzoyloxy-amino-propyl(-idene) compound thus obtained can be converted into the desired tricyclic hydroxylamine of Formula VIIa or VIIb by saponification with an alkali, for example, ethanolic caustic potash.

The methods given above for the preparation of starting compounds of Formulas IIa, b–VIIa, b are only exemplary. Self-evidently, other methods which are obvious to one skilled in the art can also be utilized. For example, Examples 8 and 9 hereinafter illustrate other routes to the starting compounds of Formula VIIa or VIIb.

The compounds of Formulas Ia and Ib which have an exocyclic double bond and/or a double bond in the 10,11-position, and their salts, can be separated into their geometric isomers, i.e., α- and β-isomers. The methods of separation are known in the art. Preferably, the geometric isomers are separated by fractional crystallization of the acid addition salts from a solvent, for example, acetone or from a solvent mixture, for example, methanol/diethyl ether.

The compounds of Formulas Ia and Ib and their salts exist as racemates. A racemate can be separated into its optical isomers in a known manner, for example, by reaction with optically active acids such as tartaric acid or camphorsulfonic acid and subsequent crystallization.

The separation of the geometric and/or optical isomers can be undertaken at an intermediate product stage, so that in this way the process in accordance with the invention is carried out with geometrically or optically uniform starting materials of Formulas IIa b–VIIa, b.

The compounds of Formula Ia and Ib have basic character and can be converted into their pharmaceutically acceptable acid addition salts. Such salts comprise, for example, those with organic acids such as oxalic acid, citric acid, acetic acid, lactic acid, maleic acid and tartaric acid, or with inorganic acids such as hydrochloric acid, hydrobromic acid or sulfuric acid. The pharmaceutically acceptable acid addition salts are crystalline, solid substances which are soluble in water, somewhat less soluble in polar solvents such as methanol, ethanol and the like, and relatively insoluble in non-polar solvents such as benzene, ether and petroleum ether.

As previously mentioned, the compounds of Formulas Ia and Ib possess an excellent antidepressive action and are therefore useful antidepressants. To demonstrate the antidepressant activity in warm-blooded animals, a compound of Formula Ia or Ib, as the test compound, was injected subcutaneously in the doses set out hereinafter to groups of 10 mice each. Sixteen hours later, the animals received 5 mg./kg. of 2-hydroxy-2-ethyl-3-isobutyl-9,10-dimethoxy - 1,2,3,4,6,7 - hexahydro - 11bH - benzo[a]quinolizine hydrochloride (substance A) injected subcutaneously. The same dosage was administered to a control group of 10 non-pretreated mice. After 30 minutes, ethanol in a dosage of 3.75 g./kg. was administered intraperitoneally to all animals, as well as to the control group of 10 mice. The average duration of sleep was determined in each group of mice. The percentage reduction of the duration of sleep compared to the ethanol-sleep potentiated by substance A served as a measure of antidepressive activity.

Results obtained utilizing the compounds of Formula Ia or Ib as the test compounds in the foregoing procedure are set forth hereinbelow in Table I:

TABLE I

|  | Doses, mg./kg. s.c. | Percent reduction in sleep |
|---|---|---|
| 1-chloro-5-(3-dimethylaminopropylidene)-5H-dibenzo[a,d]cycloheptene N-oxide hydrochloride | 5–20 | 54–86 |
| 1-chloro-10,11-dihydro-5-(3-dimethylaminopropylidene)-5H-dibenzo[a,d]cycloheptene N-oxide hydrochloride | 5–40 | 22–83 |
| 1-chloro-5-(3-dimethylaminopropyl)-5H-dibenzo[a,d]cycloheptene N-oxide hydrochloride | 5–20 | 39–74 |
| 1-chloro-10,11-dihydro-5-(3-dimethylaminopropyl)-5H-dibenzo[a,d]cycloheptene N-oxide oxalate | 5–20 | 26–57 |
| 1-fluoro-10,11-dihydro-5-(3-dimethylaminopropylidene)-5H-dibenzo[a,d]cycloheptene N-oxide hydrochloride | 20 | 42–53 |
| Amitriptyline | 20–40 | 30–56 |

The low toxicity of the compounds of Formulas Ia and Ib is illustrated by the acute toxicity in mice (24-hour values) set forth hereinbelow in Table II.

TABLE II

| | DL$_{50}$ | |
|---|---|---|
| | Iv. | P.o. |
| 1-chloro-5-(3-dimethylaminopropylidene)-5H-dibenzo[a,d]cycloheptene N-oxide hydrochloride | 140 | 810 |
| 1-chloro-10,11-dihydro-5-(3-dimethylaminopropyl-idene)-5H-dibenzo[a,d]cycloheptene N-oxide hydrochloride | 90 | 1,000–2,000 |
| 1-chloro-5-(3-dimethylaminopropyl)-5H-dibenzo[a,d]cycloheptene N-oxide hydrochloride | 60–120 | 1,000–2,000 |
| 1-chloro-10,11-dihydro-5-(3-dimethylaminopropyl)-5H-dibenzo[a,d]cycloheptene N-oxide oxalate | 90 | 21,500 |
| Amitriptyline | 20 | 100 |

The absence or only slight anticholinergic action can be shown by the absence of salivation inhibition in rabbits. The salivation was increased in rabbits in light urethane narcosis with pilocarpine injection and the amount of saliva was measured at 5-minute intervals. 1-chloro-5-(3-dimethylaminopropylidene) - 5H - dibenzo[a,d]cycloheptene N-oxide hydrochloride did not inhibit the salivation at 1 and 3 mg./kv. iv. and only slightly at 6 mg./kg. Upon the administration of the aforementioned compound, as well as by the administration of 1-chloro-10,11-dihydro-5-(3-dimethylaminopropylidene) - 5H - dibenzo[a,d]cycloheptene N-oxide hydrochloride, 1-chloro-5-(3-dimethylaminopropyl) - 5H - dibenzo[a,d]cycloheptene N-oxide hydrochloride, 1-chloro-10,11-dihydro-5-(3-dimethylaminopropyl) - 5H - dibenzo[a,d]cycloheptene N-oxide oxalate or 1-fluoro-10,11-dihydro-5-(3-dimethylaminopropylidene) - 5H - dibenzo[a,d]cycloheptene N-oxide hydrochloride, there is observed a lesser decrease in salivation than upon the administration in a similar manner of Amitriptyline.

The compounds of Formulas Ia and Ib can be used as medicaments; for example, in the form of pharmaceutical preparations which contain them or their pharmaceutically acceptable acid addition salts in admixture with pharmaceutical, inert carriers suitable for enteral, for example, oral, or parenteral application. Such carriers comprise organic or inorganic substances, such as, for example, water, gelatin, lactose, starches, magnesium stearate, talc, vegetable oils, gum arabic, polyalkyleneglycols and the like. The pharmaceutical preparations can be in solid form, for example, as tablets, dragees, suppositories, capsules, or in liquid form, for example, as solutions, suspensions or emulsions. They may be sterilized and/or contain additives such as preserving, stabilizing, wetting or emulifying agents, salts for varying the osmotic pressure or buffers. They can also contain additional therapeutically valuable substances.

Convenient pharmaceutical dosage forms contain about 1 to 200 mg. of a compound of Formula Ia or Ib. Convenient oral dosages are in the range of about 0.1 mg./kg. per day to about 5 mg./kg. per day. Convenient parenteral dosages are in the range of about 0.01 mg./kg. per day to about 1 mg./kg. per day. However, the aforementioned ranges are exemplary and can be varied upwards or downwards, depending upon the requirements of the warm-blooded animal being treated.

The following examples further illustrate the invention. All temperatures are in degrees centigrade, unless otherwise mentioned.

EXAMPLE 1

Preparation of 1-chloro - 10,11 - dihydro-5-(3-dimethylaminopropyl)-5H-dibenzo[a,d]cycloheptene N - oxide oxalate 10 g. of 1-chloro-10,11-dihydro-5-(3-dimethylaminopropyl)-5H-dibenzo[a,d]cycloheptene are dissolved in 100 ml. of methanol, and, thereafter, treated dropwise with 10.6 g. of 30% aqueous hydrogen peroxide solution. The reaction mixture is stirred at room temperature for an additional 24 hours, whereupon, with cooling, the excess of hydrogen peroxide is decomposed by addition of platinum black. Subsequently, the reaction mixture is filtered, concentrated under reduced pressure and the residue dissolved in ethanol. The ethanolic solution is treated with a solution containing 6.5 g. of oxalic acid in 100 ml. of ether and the precipitate which forms is removed by filtration to yield 1-chloro-10,11-dihydro-5-(3-dimethylaminopropyl) - 5H - dibenzo[a,d]cycloheptene N-oxide oxalate having a melting point of 125–128° C.

The 1-chloro-10,11-dihydro - 5 - (3 - dimethylaminopropyl) - 5H - dibenzo[a,d]cycloheptene employed as the starting material can be prepared as follows:

86.6 g. of Gilman alloy or magnesium turnings are heated under reflux conditions in 800 ml. of absolute ether with a trace of iodine. A solution containing 390 g. of dimethylaminopropyl chloride in 500 ml. of absolute tetrahydrofuran is subsequently added dropwise over a period of 2 hours. The mixture is heated under reflux conditions for an additional 3 hours. A solution containing 242.7 g. of 1-chloro-10,11-dihydro - 5H - dibenzo[a,d]cyclohepten-5-one in 500 ml. of absolute tetrahydrofuran is added dropwise over a period of 15 minutes to the suspension obtained. The mixture is cooled to 15° C. and heated under reflux conditions for an additional 12 hours. Subsequently, the reaction mixture is cooled to 15° and hydrolyzed with 500 ml. of saturated ammonium chloride solution, filtered and rinsed with methylene chloride. The filtrate is dried with sodium sulfate and evaporated under reduced pressure. The residual yellow substance is recrystallized from 6000 ml. of high-boiling petroleum ether to yield 1-chloro-10,11-dihydro-5-(3-dimethylaminopropyl)-5-hydroxy - 5H - dibenzo[a,d]cycloheptene having a melting point of 131–132° C.

500 g. of 1-chloro-10,11-dihydro - 5 - (3 - dimethylaminopropyl) - 5 - hydroxy - 5H - dibenzo[a,d]cycloheptene, 437 g. of red phosphorus, 4000 ml. of glacial acetic acid and 2160 ml. of 57% hydroiodic acid are heated under reflux conditions in an argon atmosphere for 3 hours. The suspension is filtered. The filtrate is washed with 2000 ml. of boiling water and subsequently cooled to 20° C. The crystals which separate out are removed by decantation and the mother liquor is concentrated under reduced pressure. The combined residues are suspended in 15,000 ml. of water, cooled with ice and, with stirring, adjusted to pH 10–12 with concentrated caustic soda. The solution is extracted with 4000 ml. of methylene chloride. The organic phase is successively washed with saturated sodium chloride solution and sodium thiosulfate solution, dried with sodium sulfate and evaporated under reduced pressure. The residue is dissolved in 2000 ml. of ether, insoluble portions are removed by filtration and subsequently evaporated to yield yellow, oily 1-chloro-10,11 - dihydro - 5 - (3 - dimethylaminopropyl) - 5H-dibenzo[a,d]cycloheptene. The hydrochloride of this compound crystallizes from acetone/ether and has a melting point of 149–153° C.

EXAMPLE 2

Preparation of 1-chloro-5-(3-dimethylaminopropylidene)-5H-dibenzo[a,d]cycloheptene N-oxide hydrochloride 835 g. of 1-chloro-5-(3-dimethylaminopropylidene)-5H-dibenzo[a,d]cycloheptene (isomeric mixture 1:1) are dissolved in 4000 ml. of methanol. 920 g. of 30% aqueous hydrogen peroxide solution are added dropwise to this solution over a period of 60 minutes and stirred at room temperature for an additional 64 hours. The reaction mixture is subsequently poured on 6000 ml. of ice-water and 1200 ml. of 25% aqueous ammonia solution and extracted with three 2000 ml. portions of methylene chloride. The combined extracts are washed with water, until no more hydrogen peroxide is detectable, filtered and made acidic with methanolic hydrochloric acid. The solution is evaporated under reduced pressure, dissolved in 1500 ml. of methanol and filtered. The residue is rinsed with a further 500 ml. of methanol and the combined filtrates are treated with 6000–7000 ml. ether. After standing at −2° C., 1-chloro-5-(3-dimethylaminopropylidene) - 5H - dibenzo[a,d]cycloheptene N-oxide hydrochloride is obtained in crystalline from having a melting point of 170–176° C.

The reaction of both components mentioned above can also be effected as follows:

500 g. of 1-chloro-5-(3-dimethylaminopropylidene)-5H-dibenzo[a,d]cycloheptene (isomeric mixture 1:1) are dissolved in 2500 ml. of methanol. The solution is allowed to cool to 0°–5° C. 550 g. of an aqueous hydrogen peroxide solution are added dropwise over a period of 60 minutes and the resulting reaction mixture is stirred at 20° C. for about 60 hours. The reaction mixture is subsequently poured into 3500 ml. of ice water and 680 ml. of 25% aqueous ammonia solution and extracted with 2000 ml. portions of methylene chloride. The combined extracts are washed with 1000 ml. of water until no trace of hydrogen peroxide remains, acidified with methanolic hydrochloric acid and concentrated under reduced pressure at 50° C. The residue is two or three times concentrated with 500 ml. absolute benzene and subsequently dried under reduced pressure for about 2–3 hours at 40° C. The yellow, viscous residue is dissolved in 2000 ml. of absolute methanol and treated with 5000 ml. of absolute ether for the purpose of crystallization. After the addition of decolorizing carbon, the entire mixture is filtered and treated with 2000 ml. of absolute ether. After inoculation and scratching, the solution is allowed to stand at —2° C. for 48 hours. Then, after filtration and washing with ether, there is obtained 1-chloro-5-(3-dimethylaminopropylidene)-5H-dibenzo[a,d]cycloheptene N - oxide hydrochloride in the crystalline form, having a melting point of 175°–176° C. From the mother liquor, through concentration and renewed crystallization, there is obtained a second crystalline portion, having a melting point of 169°–173° C.

The 1 - chloro-5-(3-dimethylaminopropylidene)-5H-dibenzo[a,d]cycloheptene used as the starting material can be prepared as follows:

17 g. of magnesium and 85 g. of dimethylaminopropyl chloride are reacted according to the procedure set forth in Example 1. The resulting Grignard compound is then treated with a solution containing 52 g. of 1-chloro-5H-dibenzo[a,d]cyclohepten-5-one in 500 ml. of absolute tetrahydrofuran. The working up proceeds in the same manner as set forth in Example 1 in the case of the preparation of 1-chloro-10,11-dihydro-5-(3-dimethylaminopropyl) - 5 - hydroxy-5H-dibenzo[a,d]cycloheptene to yield 1-chloro-5-(3-dimethylaminopropyl) - 5 - hydroxy-5H-dibenzo[a,d]cycloheptene having a melting point of 134°–136° C. The hydrochloride salt prepared therefrom has a melting point of 226–227° C. after recrystallization from methanol/ether.

10 g. of 1-chloro-5-(3-dimethylaminopropyl) - 5 - hydroxy-5H-dibenzo[a,d]cycloheptene are heated under reflux conditions for 1 hour in 50 ml. of absolute ethanol and 11 ml. of 30% ethanolic hydrochloric acid. The reaction mixture is evaporated under reduced pressure, taken up in water, washed with ether, made alkaline with 2-N caustic soda and shaken out with methylene chloride. The organic phase is washed with water, dried over sodium sulfate and evaporated to yield 1-chloro-5-(3-dimethylaminopropylidene) - 5H - dibenzo[a,d]cycloheptene as a viscous oil. This compound comprises a mixture of the two isomers in the ratio of about 1:1. The hydrochloride, which can be prepared by treatment with methanolic hydrochloric acid, has a melting point of 208–210° C. after recrystallization from ethanol/ether.

EXAMPLE 3

Preparation of 1 - chloro - 10,11-dihydro-5-(3-dimethylaminopropylidene) - 5H - dibenzo[a,d]cycloheptene N-oxide hydrochloride If in Example 2 1-chloro-5-(3-dimethylaminopropylidene)-5H-dibenzo[a,d]cycloheptene is replaced by an equivalent amount of 1 - chloro-10,11-dihydro-5-(3-dimethylaminopropylidene) - 5H - dibenzo[a,d]cycloheptene, under otherwise similar conditions, 1-chloro-10,11-dihydro - 5 - (3-dimethylaminopropylidene)-5H-dibenzo[a,d]cycloheptene N-oxide hydrochloride having a melting point of 165°–168° C. is obtained as the end-product.

The 1-chloro-10,11-dihydro - 5 - (3-dimethylaminopropylidene)-5H-dibenzo[a,d]cycloheptene employed above as the starting material can be prepared as follows:

10 g. of 1-chloro-10,11-dihydro-5-(3-dimethylaminopropyl) - 5 - hydroxy-5H-dibenzo[a,d]cycloheptene are heated under reflux conditions for 1 hour with 50 ml. of ethanol and 11 ml. of 30% ethanolic hydrochloric acid. Then, the reaction mixture is evaporated under reduced pressure and subsequently recrystallized from methanol/ether to yield 1-chloro-10,11-dihydro-5-(3-dimethylaminopropylidene)-5H-dibenzo[a,d]cycloheptene hydrochloride having a melting point of 208–210° C. This compound comprises a mixture of the two geometric isomers α+β, in the ratio of 1:1.

EXAMPLE 4

Preparation of 1-chloro-5-(3-dimethylaminopropyl)-5H-dibenzo[a,d]cycloheptene N-oxide hydrochloride 8.3 g. of 1-chloro-5-(3-dimethylaminopropyl)-5H-dibenzo[a,d]cycloheptene are dissolved in 100 ml. of methanol and treated with 9.05 g. of 30% aqueous hydrogen peroxide solution. The reaction mixture is stirred at 50° C. for 41 hours. After decomposition of the excess of hydrogen peroxide by addition of platinum black, the reaction mixture is filtered, acidified with 30% methanolic hydrochloric acid and concentrated under reduced pressure. The residue crystallizes from acetone to yield 1-chloro - 5 - (3-dimethylaminopropyl)-5H-dibenzo[a,d]cycloheptene N-oxide hydrochloride having a melting point of 179°–181° C.

The 1 - chloro-5-(3-dimethylaminopropyl)-5H-dibenzo[a,d]cycloheptene used as the starting material can be prepared as follows:

200 g. of 1-chloro-5H-dibenzo[a,d]cyclohepten-5-one are dissolved in 1000 ml. of dioxane and treated with a solution containing 69 g. of sodium borohydride in 200 ml. of water. After stirring for 12 hours at room temperature, the reaction mixture is concentrated under reduced pressure and the residue is partitioned between water and ether. The ethereal solution is washed, dried and evaporated to yield 1-chloro-5-hydroxy-5H-dibenzo[a,d]cycloheptene, which after recrystallization from ether/petroleum ether has a melting point of 143°–144° C.

70 g. of 1-chloro-5-hydroxy-5H-dibenzo[a,d]cycloheptene are dissolved in 250 ml. of absolute benzene and heated under reflux conditions for 2 hours with 105 ml. of thionyl chloride. The reaction mixture is evaporated under reduced pressure and the residue crystallized from carbon tetrachloride. The crystals which form are removed by filtration and washed with petroleum ether to yield 1,5-dichloro-5H-dibenzo[a,d]cycloheptene having a melting point of 143°–144° C.

5.6 g. of magnesium turnings are suspended in 100 ml. of aboslute tetrahydrofuran and treated with a trace of iodine and methyl iodide. A solution containing 26 g. of dimethylaminopropyl chloride in 100 ml. of tetrahydrofuran is added dropwise to this mixture over a period of about 20 minutes under reflux conditions. The mixture is boiled for an additional 3 hours. After cooling to 20° C., a solution containing 25.2 g. of 1,5-dichloro-5H-dibenzo[a,d]cycloheptene in 250 ml. of tetrahydrofuran is added dropwise over a period of 15 minutes. The mixture is subsequently heated under reflux condtions for 15 hours, cooled and hydrolyzed with 200 ml. of saturated ammonium chloride solution. Thereafter, the mixture is filtered and rinsed with methylene chloride. The filtrate is dried with sodium sulfate and evaporated under reduced pressure to yield 1-chloro-5-(3-dimethylaminopropyl)-5H-dibenzo[a,d]cycloheptene as a viscous oil having a boiling point of about 160° C./0.01 mm. Its maleamic acid salt has a melting point of 146°–147° C.

EXAMPLE 5

Preparation of 1-chloro-10,11-dihydro - 5 - (3-dimethylaminopropylidene) - 5H - dibenzo[a,d]cycloheptene N-oxide hydrochloride 5 g. of 1-chloro-10,11-dihydro-5-(3-dimethylaminopropyl)-5-hydroxy-5H-dibenzo[a,d]cycloheptene N-oxide hydrochloride are dissolved in 20 ml. of absolute methanol and heated under reflux conditions for 2 hours with 2 ml. of 24% (w./v.) methanolic hydrochloric acid. After cooling, the reaction mixture is treated with ether to crystallize 1 - chloro-10,11-dihydro-5-(3-dimethylaminopropylidene)-5H-dibenzo[a,d]cycloheptene N-oxide hydrochloride having a melting point of 163°–165° C.

The 1-chloro-10,11-dihydro - 5 - (3-dimethylaminopropyl)-5-hydroxy-5H-dibenzo[a,d]cycloheptene N-oxide hydrochloride used as the starting compound can be prepared as follows:

40 g. of 1-chloro-10,11-dihydro-5-(3-dimethylaminopropyl)-5-hydroxy-5H-dibenzo[a,d]cycloheptene are dissolved in 1000 ml. of methanol, treated with 61 ml. of 30% aqueous hydrogen peroxide solution and stirred at room temperature for 160 hours. The excess of hydrogen peroxide is subsequently decomposed by cautious addition of platinum black. Thereafter, the reaction mixture is filtered and evaporated under reduced pressure. The residue is acidified with methanolic hydrochloric acid. After the addition of ether, crystalline 1-chloro-10,11-dihydro-5 - (3-dimethylaminopropyl)-5-hydroxy-5H-dibenzo[a,d] cycloheptene N-oxide hydrochloride precipitates, having a melting point of 164°–166° C.

EXAMPLE 6

Preparation of 1-chloro-5-(3-dimethylaminopropylidene)-5H-dibenzo[a,d]cycloheptene N-oxide hydrochloride If, in the process according to Example 5, 1-chloro-5-(3 - dimethylaminopropyl) - 5-hydroxy-5H-dibenzo[a,d] cycloheptene N-oxide hydrochloride is employed in place of 1-chloro-10,11-dihydro-5-(3-dimethylaminopropyl)-5-hydroxy - 5H-dibenzo[a,d]cycloheptene N-oxide hydrochloride, under otherwise similar conditions, there is obtained 1 - chloro-5-(3-dimethylaminopropylidene)-5H-dibenzo[a,d]cycloheptene N-oxide hydrochloride which has a melting point of 172°–174° C., after recrystallization from methanol/ether.

The 1 - chloro-5-(3-dimethylaminopropyl)-5-hydroxy-5H-dibenzo[a,d]cycloheptene N-oxide hydrochloride employed as the starting material in the above reaction can be prepared as follows:

2 g. of 1-chloro-5-(3-dimethylaminopropyl)-5-hydroxy-5H-dibenzo[a,d]cycloheptene are dissolved in 60 ml. of methanol and treated with 2.1 g. of 30% aqueous hydrogen peroxide solution. The mixture is stirred at 50° C. for 35 hours. The crystals which separate out after cooling to −10° C., are removed by filtration and washed with ether to yield 1-chloro-5-(3-dimethylaminopropyl)-5-hydroxy-5H-dibenzo[a,d]cycloheptene N-oxide having a melting point of 161°–165° C. This compound is dissolved in ether and treated with methanolic hydrochloric acid to yield 1-chloro-5-(3-dimethylaminopropyl)-5-hydroxy-5H-dibenzo[a,d]cycloheptene N-oxide hydrochloride having a melting point of 174°–177° C. after recrystallization from methanol/ether.

EXAMPLE 7

Preparation of 1 - fluoro - 10,11 - dihydro-5-(3-dimethylaminopropylidene) - 5H-dibenzol[a,d]cycloheptene N-oxide hydrochloride 3 g. of 1 - fluoro - 10,11-dihydro-5-(3-dimethylaminopropylidene)-5H-dibenzo[a,d]cycloheptene are dissolved in 30 ml. of methanol in an argon atmosphere and treated with 3.5 g. of 30 percent aqueous hydrogen peroxide solution. The mixture is maintained at 50° C. with stirring for 24 hours. After cooling to 0° C., the excess of hydrogen peroxide is decomposed by addition of platinum black. The solution is filtered, acidified with methanolic hydrochloric acid and evaporated under reduced pressure. The residue is crystallized from methanol/ether. The crystals which form are removed by filtration and dried under reduced pressure at 100° C. to yield 1-fluoro - 10,11 - dihydro-5-(3-dimethylaminopropylidene)-5H-dibenzo[a,d]cycloheptene N-oxide hydrochloride, having a melting point of 166°–168° C. The compound comprises a mixture of the two α- and β-isomers in the ratio of about 1:1.

The 1-fluoro-10,11-dihydro-5-(3-dimethylaminopropylidene)-5H-dibenzo[a,d]cycloheptene employed as the starting compound can be prepared as follows:

14.8 g. of powdered phthalic acid anhydride, 18.5 g. of o-fluorophenylacetic acid and 0.5 g. of freshly melted sodium acetate are heated at 235°–240° C. for 3 hours and the resulting water is removed by distillation. The hot reaction mixture is poured into a mortar and pulverized. The crude product is recrystallized from acetone/petroleum ether to yield o-fluorobenzylidenephthalide, having a melting point of 148°–151° C.

72.6 g. of o-fluorobenzylidenephthalide, 55.0 g. of red phosphorus and 450 ml. of hydroiodic acid ($d=1.75$) are heated under reflux conditions in an argon atmosphere for 24 hours. The reaction mixture is cooled, treated with 500 ml. of water and filtered. The residue is warmed to 80° C. with 2-N caustic soda and again filtered. The alkaline solution is acidified, extracted with methylene chloride, washed with water, dried and concentrated. The residual solid is recrystallized from acetone/low-boiling petroleum ether to yield white crystals of 2-(o-fluorophenethyl)benzoic acid having a melting point of 93°–94° C.

280 g. of polyphosphoric acid is heated to 120° C. 70.0 g. of 2-(o-fluorophenethyl)benzoic acid are then added at once in an argon atmosphere and the reaction mixture is subsequently maintained at 150° C. for 3 hours. The hot reaction mixture is poured onto ice-water and extracted with ether. The ethereal extracts are washed with water, 2-N sodium hydroxide and again with water until neutral, dried over sodium sulfate, filtered and concentrated. The residue is distilled under strongly reduced pressure, whereby a yellow oil is obtained which gradually crystallizes on standing to yield 1-fluoro-10,11-dihydro-5H-dibenzo[a,d] cyclohepten-5-one, having a melting point of 64°–65° C.

19.1 g. of Gilman alloy and a trace of iodine are suspended in 150 ml. of absolute ether and reacted with 88 g. of dimethylaminopropyl chloride in 200 ml. of tetrahydrofuran as in Example 1. A solution containing 50 g. of 1 - fluoro - 10,11 - dihydro-5H-dibenzo[a,d]-cyclohepten-5-one in 250 ml. of tetrahydrofuran is added dropwise at 20° C. over a period of 1 hour to the resulting suspension. The mixture is heated under reflux conditions for an additional 15 hours and, after cooling, hydrolyzed with saturated ammonium chloride solution. The reaction mixture is filtered, rinsed with methylene chloride, dried with sodium sulfate and evaporated under reduced pressure to yield 1-fluoro 10,11 - dihydro - 5-(3-dimethylaminopropyl) - 5-hydroxy-5H-dibenzo[a,d]cycloheptene, which after crystallization from high-boiling petroleum ether, has a melting point of 115°–117° C.

15 g. of 1-fluoro-10,11-dihydro-5-(3-dimethylaminopropyl) - 5 - hydroxy-5H-dibenzo[a,d]cycloheptene are heated under reflux conditions for 2 hours with 100 ml. of absolute ethanol and 12 ml. of 30 percent ethanolic hydrochloric acid. Thereafter, the mixture is evaporated under reduced pressure. The working up is effected in the same manner as stated in Example 1, whereby 1-fluoro-10,11 - dihydro - 5-(3-dimethylaminopropylidene)-5H-dibenzo[a,d]cycloheptene is obtained. Its hydrochloride salt has a melting point of 187°–200° after recrystallization from methanol/ether. The compound comprises a mixture of the two α- and β-isomers.

EXAMPLE 8

Preparation of 1 - chloro - 10,11-dihydro-5(3-dimethylaminopropylidene) - 5H - dibenzo[a,d]cycloheptene N-oxide hydroiodide 0.2 g. 1 - chloro - 10,11-dihydro-5-(3-N-hydroxy-N-methylaminopropylidene) - 5H-dibenzo[a,d]cycloheptene is allowed to stand at room temperature with a solution containing 0.97 g. methyl iodide in 500 ml. of acetone for one hour. After dehydration under reduced pressure, there is obtained 1-chloro-10,11-dihydro-5-(3-dimethylaminopropylidene) - 5H - dibenzo[a,d]cycloheptene N-oxide hydroiodide, which after crystallization from methanol/ether has a melting point of 103°–104° C. After neutralization with sodium hydroxide solution and reaction of the base which is released with ethanolic hydrochloric acid, there is obtained the corresponding hydrochloride, which has a melting point of 165°–168° C.

The 1 - chloro - 10,11 - dihydro-5-(3-N-hydroxy-N-methylaminopropylidene) - 5H-dibenzo[a,d]cycloheptene employed as the starting material can be prepared as follows:

To 14 g. of Gilman alloy in 100 ml. of absolute ether, after the addition of a trace of iodine or methyl iodide, there is added dropwise over a period of about 30 minutes under reflux conditions a solution containing 45.6 g. of 1-chloro-3-methoxypropane in 300 ml. of absolute ether. The reaction mixture is heated for an additional 3 hours. After cooling to 20° C., a solution containing 48.5 g. of 1 - chloro - 10,11-dihydro-5H-dibenzo[a,d]cyclohepten-5-one in 160 ml. of tetrahydrofuran is added over a period of 30 minutes. Subsequently, the mixture is heated under reflux conditions for 12 hours, hydrolyzed with cooling, with 150 ml. of saturated ammonium chloride solution, filtered, rinsed with chloroform, dried with sodium sulfate and evaporated to yield 1-chloro-10,11-dihydro - 5 - (3 - methoxypropyl)-5-hydroxy-5H-dibenzo[a,d]cycloheptene, which has a melting point of 80°–81° C. after recrystallization from ether/petroleum ether.

53.3 g. of 1 - chloro - 10,11-dihydro-5-(3-methoxypropyl) - 5 - hydroxy-5H-dibenzo[a,d]cycloheptene are heated under reflux conditions for 1 hour in 250 ml. of methanol and 53 ml. of 30 percent methanolic hydrochloric acid. Thereafter, the mixture is evaporated under reduced pressure, taken up in ether, washed with water, dried with sodium sulfate and again evaporated to yield 1 - chloro - 10,11 - dihydro-5-(3-methoxypropylidene)-5H-dibenzo[a,d]cycloheptene as a yellow oil.

48.5 g. of 1-chloro-10,11-dihydro-5-(3-methoxypropylidene)-5H-dibenzo[a,d]cycloheptene are dissolved in 150 ml. of methylene chloride, cooled to 10° C. and treated over a period of 15 minutes with a solution containing 30 g. of boron trichloride in 150 ml. of methylene chloride. The reaction mixture is stirred at room temperature for an additional 19 hours, then poured onto ice-water, extracted with methylene chloride, washed with water and dried over sodium sulfate. After evaporation, 1-chloro-10,11 - dihydro - 5 - (3 - chloropropylidene)-5H-dibenzo [a,d]cycloheptene is obtained as a yellow-orange oil which slowly crystallizes out, and has a melting point of 51°–53° C.

A mixture of 20 g. of 1-chloro-10,11-dihydro-5-(3-chloropropylidene)-5H-dibenzo[a,d]cycloheptene, 80 ml. of absolute methanol and 30 g. of methylamine is heated at 120° for 12 hours in an autoclave under a nitrogen pressure of 6-atmospheres. The solution is subsequently evaporated under reduced pressure and the yellow, oily residue is treated with methanolic hydrochloric acid whereby 1 - chloro - 10,11-dihydro-5-(3-methylaminopropylidene) - 5H - dibenzo[a,d]cycloheptene hydrochloride precipitates. This compound has a melting point of 209–210° C. after recrystallization from methanol/ether. It comprises a mixture of the α- and β-isomers in the ratio of about 3:2.

The free base is obtained from the 1-chloro-10,11-dihydro - 5 - (3 - methylaminopropylidene) - 5H-dibenzo [a,d]cycloheptene hydrochloride by neutralization with aqueous sodium hydroxide solution. The free base is dissolved in 300 ml. of ether and treated dropwise at —5° C. over a period of 45 minutes with a solution containing 6.65 g. of benzoyl peroxide in 90 ml. of ether and 30 ml. of chloroform. The mixture is stirred at —5° to 0° C. for 3 hours, whereupon a precipitate gradually forms. The precipitate is removed by filtration and washed with ether. The ethereal solution is washed with dilute hydrochloric acid, then with sodium bicarbonate solution and water, dried over sodium sulfate and evaporated whereby oily 1-chloro-10,11-dihydro-5-(3-benzolyloxy-N - methylaminopropylidene) - 5H - dibenzo[a,d]cycloheptene is obtained.

10 g. of 1 - chloro - 10,11 - dihydro - 5 - (3 - N-benzoyloxy - N - methylaminopropylidene) - 5H - dibenzo[a,d]cycloheptene are heated under reflux conditions for an hour with 150 ml. of ethanol and a solution containing 2 g. of potassium hydroxide in 20 ml. of water. After cooling, the mixture is filtered and the filtrate is evaporated under reduced pressure. The residue is taken up in ether and the ethereal solution is shaken with dilute hydrochloric acid. The acidic extracts are made alkaline with concentrated ammonia solution, extracted with ether, dried and evaporated to yield 1-chloro-10,11-dihydro - 5 - (3 - N - hydroxy - N - methylaminopropylidene)-5H-dibenzo[a,d]cycloheptene, having a melting point of 109°–112° C. after recrystallization from benzene/petroleum ether. The compound comprises a mixture of the geometric isomers in the ratio of about 1:2.

EXAMPLE 9

Preparation of 1 - chloro - 10,11 - dihydro - 5 - (3 - dimethylaminopropyl) - 5H - dibenzo[a,d]cycloheptene N-oxide hydroiodide 1 - chloro - 10,11 - dihydro - 5 - (3 - N - hydroxy - N-methylaminopropyl) - 5H - dibenzo[a,d]cycloheptene is heated at room temperature with a solution containing methyl iodide in acetone whereby 1 - chloro - 10,11-dihydro - 5 - (3 - dimethylaminopropyl) - 5H - dibenzo [a,d]cycloheptene N-oxide hydroiodide is obtained as the reaction product. After neutralization with sodium hydroxide solution and treatment of the released base in ethanolic solution with a solution of oxalic acid in ether, the corresponding oxalate is obtained, which has a melting point of 125°–128° C.

The 1 - chloro - 10,11 -dihydro - 5 - (3 - N - hydroxy-N - methylaminopropyl) - 5H - dibenzo[a,d]cycloheptene employed as the starting material can be prepared as follows:

A solution containing 102.5 g. of 1 - chloro - 10,11-dihydro - 5 - (3 - dimethylaminopropyl) - 5H - dibenzo [a,d]cycloheptene in 500 ml. of methylene chloride is added dropwise to a solution containing 55 g. of cyanogen bromide in 500 ml. of methylene chloride. The mixture is stirred at room temperature for 12 hours and subsequently poured onto ice-water. The methylene chloride phase is washed with 2-N hydrochloric acid and water, dried with sodium sulfate and evaporated under reduced pressure. The residual yellow oil is crystallized from ether to yield 1 - chloro - 10,11 - dihydro - 5 - (3 - N - cyano - N-methylaminopropyl) - 5H - dibenzo[a,d]cycloheptene having a melting point of 69°–71° C. After re-solution in benzene/ether, this compound can be further purified chromatographically on 500 g. of silica gel.

A mixture of 650 g. of 1 - chloro - 10,11 - dihydro - 5-(3 - N - cyano - N - methylaminopropyl) - 5H - dibenzo [a,d]cycloheptene, 4000 ml. of glacial acetic, 2000 ml. of water and 1000 ml. of concentrated hydrochloric acid is heated under reflux conditions for 24 hours. Thereafter, the reaction mixture is concentrated under reduced pressure, diluted with 20,000 ml. of ice-cold water and washed with 5000 ml. of methylene chloride. The mixture is made alkaline with concentrated caustic soda and the resulting precipitate is taken up in methylene chloride. Upon concentration of the methylene chloride solution, there is obtained a brown-red oil which is converted into crystalline 1 - chloro - 10,11 - dihydro - 5 - (3 - methylaminopropyl) - 5H - dibenzo[a,d]cycloheptene hydrochloride by the addition of methanolic hydrochloric acid. This compound has a melting point of 168–169° C. after recrystallization from methanol/ether. The free base is obtained from the hydrochloride by neutralization with sodium hydroxide solution.

The 1 - chloro - 10,11 - dihydro - 5 - (3 - methylaminopropyl) - 5H - dibenzo[a,d]cycloheptene obtained above is treated with benzoyl peroxide according to the procedure set forth in Example 8 and the 1 - chloro - 10,11-dihydro - 5 - (3 - N - benzoyloxy - N - methylaminopropyl) - 5H - dibenzo[a,d]cycloheptene obtained is boiled with ethanolic caustic potash according to the details of Example 8, to yield 1 - chloro - 10,11 - dihydro- 5 - (3 - N - hydroxy - N - methylaminopropyl) - 5H-dibenzo[a,d]cycloheptene as a crystalline powder having a melting point of 104°–105° C.

EXAMPLE 10

Preparation of 1 - chloro - 10,11 - dihydro - 5H - (dimethylaminopropylidene) - 5H - dibenzo[a,d]cycloheptene N-oxide hydrochloride 1.8 g. of N,N-dimethylhydroxylamine hydrochloride are dissolved in 10 ml. of nitromethane and treated with 1.6 g. of 95 percent sodium methylate solution as well as a solution containing 1 g. of 1 - chloro - 10,11 - dihydro - 5 - (3 - bromopropylidene) - 5H - dibenzo[a,d] cycloheptene in 6 ml. of nitromethane. The mixture is stirred subsequently for 24 hours at 30°–35° C. and concentrated under reduced pressure. The residue is taken up in methylene chloride, washed with water, dried, acidified with methanolic hydrochloric acid and thereafter evaporated under reduced pressure. Crystallization from methanol/ether yields 1 - chloro - 10,11 - dihydro - 5H-(dimethylaminopropylidene) - 5H - dibenzo[a,d]cycloheptene N-oxide hydrochloride, having a melting point of 165°–168° C. The starting materials can be prepared according to the following procedure:

To 14 g. of Gilman alloy in 100 ml. of absolute ether, after the addition of a trace of iodine or methyliodide, is added dropwise a solution containing 45.6 g. of 1-chloro-3-methoxypropane in 300 ml. of absolute ether over a period of 30 minutes under reflux conditions. The reaction mixture is heated for an additional 3 hours. After cooling to about 20° C., a solution containing 48.5 g. of 1-chloro-10,11 - dihydro - 5H - dibenzo[a,d]cyclohepten - 5 - one in 160 ml. of tetrahydrofuran is added over a 30-minute period. The reaction mixture, thereafter, is heated for 12 hours under reflux conditions, hydrolyzed, with cooling, with 150 ml. of saturated ammonium chloride solution, filtered, washed with chloroform, dried with sodium sulfate and evaporated. The resulting 1-chloro-10,11-dihydro - 5 - (3 - methoxypropyl) - 5 - hydroxy - 5H-dibenzo[a,d]cycloheptene, has a melting point of 80°–81° C. after recrystallization from ether/petroleum ether.

1 - chloro - 10,11 - dihydro-5-(3-methoxypropyl)-5-hydroxy-5H-dibenzo[a,d]cycloheptene can in a similar manner be reacted with hydrobromic acid in glacial acetic acid. After the splitting off of water, there is obtained 1-chloro - 10,11 - dihydro-5-(3-bromopropylidene)-5H-dibenzo[a,d]cycloheptene, which following conventional work-up has a melting point of 65°–67° C. The reaction product comprises an isomeric mixture (about 60 percent α-isomer).

EXAMPLE 11

Preparation of tablets

| | G. |
|---|---|
| 1-chloro - 5 - (3 - dimethylaminopropylidene)- 5H-dibenzo[a,d]cycloheptene N - oxide hydrochloride | 28.05 |
| Lactose | 110 |
| Corn starch | 57.95 |
| Talcum | 3.40 |
| Magnesium stearate | 0.6 |
| | 200.00 |

The ingredients are intimately mixed with one another and pressed into tablets each weighing 200 mg., which are subsequently coated with ethyl cellulose and Carbowax.

We claim:
1. A compound selected from the group consisting of compounds of the formulas

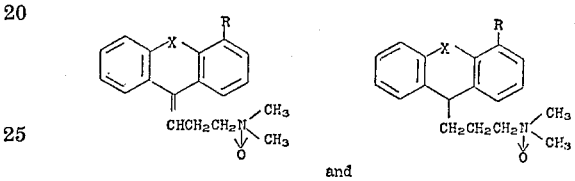

and wherein R is chlorine or fluorine and X is ethylene or vinylene, and their pharmaceutically acceptable acid addition salts.

2. A compound in accordance with claim 1 of the formula

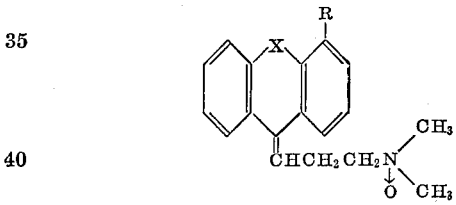

wherein R is chlorine or fluorine and X is ethylene or vinylene, and their pharmaceutically acceptable acid addition salts.

3. A compound in accordance with claim 2, wherein X is vinylene.

4. A compound in accordance with claim 3, 1-chloro-5-(3-dimethylaminopropylidene) - 5H - dibenzo[a,d]cycloheptene N-oxide.

5. A compound in accordance with claim 2, wherein X is ethylene.

6. A compound in accordance with claim 5, 1-chloro-10,11-dihydro-5-(3-dimethylaminopropylidene) - 5H - dibenzo[a,d]cyclopheptene N-oxide.

7. A compound in accordance with claim 5, 1-fluoro-10,11-dihydro-5-(3-dimethylaminopropylidene) - 5H - dibenzo[a,d]cycloheptene N-oxide.

8. A compound in accordance with claim 1 of the formula

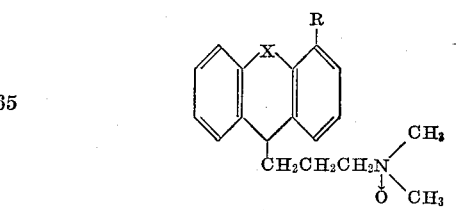

wherein R is chlorine or fluorine and X is ethylene or vinylene, and their pharmaceutically acceptable acid addition salts.

9. A compound in accordance with claim 8, wherein X is vinylene.

10. A compound in accordance with claim 9, 1-chloro-5-(3-dimethylaminopropyl) - 5H - dibenzo[a,d]cycloheptene N-oxide.

11. A compound in accordance with claim 8, wherein X is ethylene.

12. A compound in accordance with claim 11, 1-chloro-10,11-dihydro-5(3-dimethylaminopropyl) - 5H - dibenzo[a,d]cycloheptene N-oxide.

13. A compound of the formula

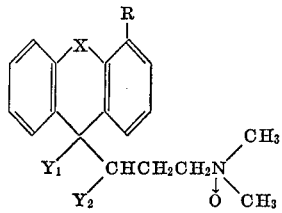

wherein R is chlorine or fluorine and X is ethylene or vinylene and one of the symbols $Y_1$ and $Y_2$ is hydrogen and the other is hydroxyl, and their pharmaceutically acceptable acid addition salts.

14. A compound in accordance with claim 3, 1-chloro-5-(3-dimethylaminopropylidene) - 5H - dibenzo[a,d]cycloheptene N-oxide.

References Cited

UNITED STATES PATENTS

| | | | |
|---|---|---|---|
| 2,862,968 | 12/1958 | Tiffany | 260—570 |
| 3,299,139 | 1/1967 | Pedersen | 260—570.8 |
| 3,372,196 | 3/1968 | Engelhardt | 260—570.8 |

FOREIGN PATENTS

| | | | |
|---|---|---|---|
| 618,034 | 2/1949 | Great Britain | 260—570.8 |
| 1,447,508 | 6/1966 | France | 260—570.8 |

ROBERT V. HINES, Primary Examiner

U.S. Cl. X.R.

260—343.3, 346.7, 459, 501.1, 501.18, 501.21, 515 A, 551 C, 567.6 M, 570.6, 590, 592, 611 F, 618 D, 618 F, 649 R, 649 F; 424—330